INVENTOR.
ANGELA D. BARTOLO

ATTORNEY

United States Patent Office 3,387,391
Patented June 11, 1968

3,387,391
FLASH CARDS FOR TEACHING ARITHMETIC
Angela D. Bartolo, 88 Martin Road,
Livingston, N.J. 07039
Filed Feb. 1, 1967, Ser. No. 613,187
6 Claims. (Cl. 35—31)

ABSTRACT OF THE DISCLOSURE

A series of flash cards with shape of semi-discs has printed on one surface thereof a particular numeral, for example, the numeral 3, and a mathematical function, i.e. a plus sign and also, on the same side, a set of unrelated numerals which are to be added to the addend 3. Adjacent each one of the unrelated numerals is a hole passing through the card. On the back of the card, there is a numeral associated with each hole, which numeral is the sum of the addend three plus the unrelated addend associated with the particular hole. Also on the back of the card is the same numeral 3 with the inverse function, i.e. a minus sign. The student utilizing the card would look at one side of the card and try to add the numeral three plus one of the unrelated addends. To check his answer, the student sticks a pencil or other object through the hole and looks at the reverse side of the card checking the sum on the reverse side adjacent the hole to see if his answer is correct. He will then note and understand that the answer on the back of the card is a sum which if the numeral three is subtracted therefrom as indicated on the back of the card will give him the first unrelated addend on the plus side of the card. Accordingly, he is being taught addition and subtraction at the same time, and further, the full recognition of the inverse relationship of these two mathematical functions. This is accomplished in an extremely simple manner as the student need only use a pencil and the easily printed flash cards. Further, a stack of flash cards can be provided for each number up to ten with each flash card being of a different color so as to be easily differentiated one from another by the student. Still further, another set of flash cards can be made for the inverse mathematical functions of multiplication and division. These flash cards are used in the same manner as those used to teach addition and subtraction.

In general, this invention relates to a new and improved set of flash cards for teaching arithmetic and, more particularly, relates to a new and improved method of utilizing flash cards to teach inverse mathematical relationships to young students.

Background of the invention

There have been many teaching devices wherein one element of a three part equation is maintained in secrecy until a student forms his own answer and then can be seen by the student to check his answer. This has been true even in the flash card art. U.S. Patents 2,797,499 and 3,206,872 are examples of such teachings. However, these prior art devices do not effectively teach inverse mathematical relationships and are not made for simple and easy reverse use without the need for separate cards. Further, none of these devices is merely a flash card, but requires some additional devices associated therewith which adds to their expense. The present invention requires only the printed card and a pencil, which pencil it is assumed the student has available. Because of this, the flash card of the present invention can be manufactured very inexpensively while effecting the same or better results in teaching the students their arithmetic.

The present invention will provide the student with reenforcement of many of the laws of contemporary mathematics which are being taught to him each day. That is, these flash cards are especially directed toward teaching the commutative laws of addition and multiplication and have the added advantage of showing the indentity element of addition results from the use of the addend "zero" and that the identity element of multiplication results from the use of the factor "one."

Further, the properties of the structure of the number system are reviewed and related to the basic arithmetic operations. Thus providing an interesting and exciting method for developing computational skills in the user. The flash cards are also useful for intermediate grade students in need of remedial attention in arithmetic as they provide an excellent review of the basic arithmetic operation.

Brief summary of the invention

Thus the invention resides in providing flash cards having inverse functions of the same number printed on opposite sides thereof and a series of random numerals placed adjacent holes around the card which random numerals are to be operated on by the main numeral. The random numerals on one side of the card, when operated on by the main numeral in accordance with the indicated arithmetic function will be associated with an answer on the opposite side of the card adjacent to their respective holes. The cards themselves can be of different colors so as to encourage the students to recognize the differences between the main numerals.

Figure 1:
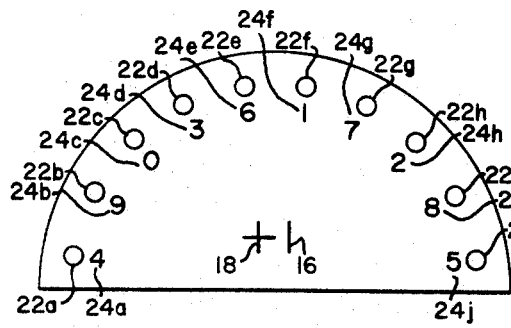
FIGURE 1 is a plan view of one side of one card designed in accordance with the teachings of the present invention.

In FIGURE 1, there is shown a flash card 10 designed in accordance with the teaching of the present invention. The flash card 10 has two sides 12 and 14. On the side 12, in the center thereof, there is placed the operating or main numeral 16 which in this case is the number "1." Additionally, adjacent the operating numeral 16 there is the operating arithmetic function 18. On the back 14 of the card 10 there is provided the same operating numeral 16 and adjacent thereto an arithmetic function 20 which is the inverse of the arithmetic function 18. The arithmetic function 20 is a minus sign while the arithmetic function 18 is a plus sign.

Positioned about the card 10 are a series of holes 22a–22j which pass through the card 10. Adjacent each hole 22a–22j on the front side 12 of the card 10 there is a random numeral 24a–24j. It is expected that the random numerals 24a–24j will all be different. Thus, the student will be asked to determine what the sum of "1" plus the random numeral or addend 24b, for example "9" is. He need merely place a pencil through the hole 22b adjacent the numeral "3" to check his answer. On the back surface 14 of the card 10 are the sums of "1" plus the random numeral 24a–24j associated with each of the holes 22a–22j. Accordingly, if a student passed a pencil through the opening 22b adjacent numeral 24b, he would come up with the sum of "1" plus "9" or numeral 26b, i.e. the number "10" on side 14 of the flash card 10. Additionally, he would note that if he were to have started on the back side 14 and been asked to subtract "1" from "10," he would have come up with the numeral 24b or "9" on the front side 12 of the card 10.

Figure 2:
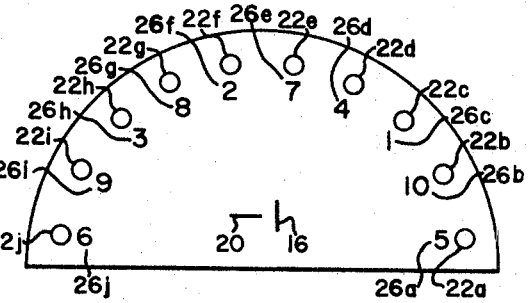
FIGURE 2 is a back side of the card of FIGURE 1.

Accordingly, the student has been taught not only to add and subtract, but that these relationships are inverse functions of each other. This has been done with a card which is easy to produce as it is merely printed and punched as shown in FIGURES 1 and 2.

Further, the student would have noted, in accordance with the commutative law of addition that the position of the addends 16 and 24b are totally interchangeable without in any way affecting the sum 26b on the reverse side of the card.

Still further, the student would note that the identity element of addition is found in the use of the numeral "0," i.e. numeral 24c, as the addend 16 is equal to the sum 26c whenever he uses the addend "0."

Figure 5:
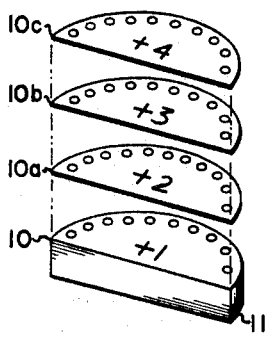
FIGURE 5 is an exploded view of a stack of cards designed in accordance with the teachings of the present invention.

It will be understood that, as shown in FIGURE 5, a series of cards 10, 10a, 10b and 10c are formed into a stack 11 with each card having a different designating number 16. As shown, the designating numeral 16 on the card 10 is "1," on 10a is "2," on 10b is "3," and 10c is "4." Each of the cards 10, 10a, 10b and 10c etc. forming the stack 11 is of a different color so as to better indicate to the student the difference between the cards.

Figure 3:
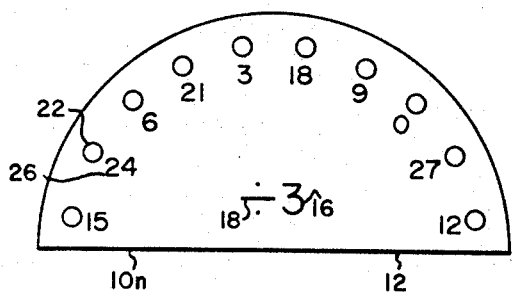
FIGURE 3 is a plan view of a second card designed in accordance with the teachings of the present invention.
Figure 4:
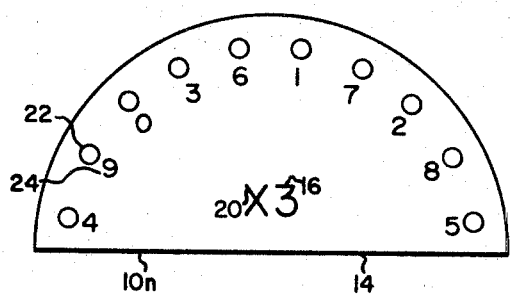
FIGURE 4 is the back side of the card of FIGURE 3.

As shown in FIGURES 3 and 4, the designating number 16 can be varied and could be as shown in FIGURES 3 and 4 the numeral "3." The card 10n in FIGURES 3 and 4 has as its arithmetic function 18 a division sign on the side 12 and the inverse mathematical function 20 on the back side 14 is a multiplication sign. The operation of the holes 22 and the random numbers 24 and 26 are exactly as was discussed with respect to the flash card 10 of FIGURES 1 and 2.

It can thus be seen that the student has learned from the use of the cards 10n in FIGURES 3 and 4 that the factors in multiplication are the main numerals 16 and one of the random numerals 24 with the product being the numeral 26. Further, when the factor 16 is utilized with a division sign then the result is the other factor 24. Thus the relationship between factors and multiples is developed in a very sophisticated manner. This understanding of the properties of factors and multiples provides the readiness needed for such mathematical topics as factorization; and in the field of fractions the topics of least common denominator and greatest common factor.

Further, as with addition, the commutative law of multiplication is taught as the student recognizes that the factors 16 and 24 can be interchanged without changing the resultant product 26. Further, the student will learn that the identity element in multiplication is the numeral "1" as he can see that the product of "1" times "3" is still "3."

It should also be noted that the flash cards of the present invention are extremely useful in teaching the concept of closure to students in that the sets of products or sums 26 are excellent examples to the student of this concept.

The present invention may be embodied in other specific forms without departing from the spirit or essential attributes thereof and, accordingly, reference should be made to the appended claims rather than to the foregoing specification as indicating the scope of the invention.

I claim as my invention:

1. A flash card for teaching arithmetic comprising a flat planar sheet, said flat planar sheet having printed on one side thereof a designated numeral and an arithmetic function adjacent thereto, said sheet having a series of holes passing therethrough, each of said holes having a different numeral printed adjacent thereto on said one side of said sheet, the other side of said sheet having printed thereon said designated numeral and the inverse arithmetic function of said arithmetic function on said one side of said sheet, said other side of said sheet having printed adjacent to said holes the individual number forming the answer to the arithmetic equation formed on said one side by said designated number, said arithmetic function, and the said different numeral adjacent the particular holes whereby if one were to place an object through the particular hole, he could merely by turning the sheet over determine the answer to the said arithmetic equation by looking at the numeral of the other side of the sheet adjacent the hole selected by the object passing through the hole.

2. The flash card for teaching arithmetic of claim 1 wherein said arithmetic function is an addition sign and said inverse arithmetic function is a subtraction sign.

3. The flash card for teaching arithmetic of claim 2 wherein said arithmetic function is a division sign and said inverse mathematical function is a multiplication sign.

4. A stack of flash cards utilizing the flash cards of claim 1 wherein each of said flash cards has a progressively different whole number integer for its definite number.

5. The stack of flash cards of claim 4 wherein each of said flash cards is a different color to indicate the different whole number integer.

6. The flash card of claim 1 wherein said flat planar sheet is in the form of a semi-disc, said holes being arranged along the semi-circular outer edge of said semi-disc, said designated numeral and said arithmetic function being printed in the center of said disc on said one side, said designated numeral and said inverse arithmetic function being printed in the center of said other side.

References Cited
UNITED STATES PATENTS

| | | | |
|---|---|---|---|
| 1,617,657 | 2/1927 | Studebaker | 35—31 XR |
| 2,797,499 | 7/1957 | Lagerdahl | 35—31 |
| 2,965,980 | 12/1960 | Day | 35—31 |
| 3,206,872 | 9/1965 | Nason et al. | 35—31 |
| 3,283,417 | 11/1966 | Lohmar | 35—31 XR |

EUGENE R. CAPOZIO, *Primary Examiner.*

W. H. GRIEB, *Examiner.*